United States Patent [19]

Frolov et al.

[11] 4,008,364

[45] Feb. 15, 1977

[54] APPARATUS FOR CONTINUOUS REFINING OF METALS

[76] Inventors: Jury Fedorovich Frolov, prospekt Karla Marxa, 8/2, kv. 70; Jury Anatolievich Naryshkin, ulitsa Bljukhera, 7, kv. 55; Vladimir Semenovich Cherednichenko, ulitsa Zorge, 269, kv. 79; Jury Fedorovich Piljukov, ulitsa Nemirovicha-Danchenko, 163, kv. 6; Gennady Ivanovich Orlov, ulitsa Vatutina, 27, kv. 20, all of Novosibirsk; Aron Semenovich Mikulinsky, ulitsa Bosova, 1, kv. 54, Istra Moskovskoi oblasti; Serafim Nikolaevich Suturin, ulitsa Savvy Kozhevnikova, 2, kv. 22, Novosibirsk; Leonid Vladimirovich Slobodkin, ulitsa Gogolya, 34, kv. 32; Konstantin Stepanovich Dashkov, prospekt Lenina, 52, kv. 10, both of Ust-Kamenogorsk Vostochno-Kazakhstanskoi Oblasti, all of U.S.S.R.

[22] Filed: July 24, 1975

[21] Appl. No.: 599,040

[52] U.S. Cl. .................................... 13/20; 13/31
[51] Int. Cl.² ...................., F27B 17/00; F27D 7/06
[58] Field of Search ................. 13/20, 22, 25, 31; 202/173, 234

[56] References Cited

UNITED STATES PATENTS

| 1,242,337 | 10/1917 | Fulton | 13/8 |
| 3,803,335 | 4/1974 | Esjutin et al. | 13/20 |

Primary Examiner—R. N. Envall, Jr.

[57] ABSTRACT

Apparatus for the continuous refining of metals, such as, lead, tin, comprising a distillation column built up of identical boxes set up one upon another and forming evaporation stages along which the metal flows off sequentially in the form of a thin film. Extending through all the column boxes are preferably three graphite heater rods set up in a row, the heater being preferable connected in a three-phase electric circuit. The heating of the metal film is conducive to the distillation of impurity vapors, referred to as volatilized impurities, flowing to condensing shields.

8 Claims, 3 Drawing Figures

APPARATUS FOR CONTINUOUS REFINING OF METALS

The present invention relates to non-ferrous metallurgy and more particularly to that field of non-ferrous metallurgy where refinery distillation of metals, such as, lead, zinc, tin and others, is accomplished in vacuum apparatus (electric furnaces).

Already known in the prior art are vacuum refining apparatus (see, e.g., Inventor's Certificate of the USSR No. 268651, and USSR application No. 1330861/22-1, dated May 13, 1969 according to which Inventor's Certificate was granted), comprising a distillation column built up of several stages-tray evaporators, a central heater, perforated shields, a condenser and a condensate tank.

The main structural element of the known vacuum distillation apparatus (electric furnaces) is the distillation column disposed in a vacuum chamber and made up of a plurality of individual circular open evaporation stages-trays in a graphitized carbonaceous material set up in succession one under another, with the refined melt being warmed on these trays by means of a resistance heater (in the form of a graphite rod or tube) arranged inside the distillation column, in its center. The beginning and the end of the heater are connected through current leads, extending through vacuum seals into the apparatus space, to winding lead-outs of a single-phase step-down transformer.

As the molten metal flows from one tray into another, passing along the column in a vertical direction downwards, highly volatile impurities escape from the hot melt accommodated in the trays, to be discharged thereafter via vapor pipes into the condensation zone from which they are withdrawn from the apparatus. At the column outlet the refined metal is collected and cooled in a separate tank.

To provide the sequential overflow of the melt along the column the bottom part of each tray is fitted with a hole through which the melt runs off from the overlying tray into the underlying tray.

Thus, in the prior-art apparatus (electric furnaces) of this type the mechanism of refining comprises the following interrelated steps: the heating of the melt to a distillation temperature, isothermal holding at this temperature to provide the evaporation of highly volatile elements, their passing into a vaporous state, the transfer of these vapors to the condensation zone and the removal of condensate and refined product outside the apparatus.

The above outlined apparatus suffer from a number of structural disadvantages.

Thus, the inherent design of the known evaporation trays and their geometry result in the distillation of heavy masses of metal from a relatively small evaporation surface. Under these conditions the process of mass transfer of impurities from the melt to the vapor-melt boundary surface is impeded, with the mass transfer rate in the melt volume being less than the rate of impurity evaporation, which leads to a lower rate of distillation. The latter adversely affects the quality of metal refining and the output of an electric furnace.

Moreover, it is known that in the course of transfer of the molten metal along the furnace it is depleted in highly volatile constituents and, as a result, the quantitative proportions of the constituents, present in the vapor phase, vary along the evaporator length and furnace height. However, the design of the now-existing apparatus ignores this phenomenon which has an adverse effect on the quality and intensity of distillation.

The prior-art apparatus (electric furnaces) of the above type are connected according to a single-phase circuit, featuring thereby a restricted power.

An increase in their rating will result in a current and voltage unbalance and in irregular loading of phases of a three-phase power supply circuit. According to electrotechnical standards in force, the voltage unbalance, for example, should be maintained within 2%.

Therefore, the unbalance ensuing from an increase in the rating of such single-phase apparatus (electric furnaces) must be eliminated by using controllable or non-controllable balancing devices, which adds to the cost of such apparatus.

In case a single-phase load is to be coupled to a three-phase power supply circuit, it should not be overlooked that linear currents in two phases will be $\sqrt{3}$ times larger in magnitude than those produced when powering a three-phase load of the same rating, with the current of the load under consideration being absent in the third phase.

Therefore at a similar phase resistance of the power supply circuit the active losses of energy in powering single-phase apparatus (electric furnaces) will be twice as great as those encountered in powering a three-phase apparatus of the same rating.

Moreover, when a single-phase apparatus is connected to a three-phase circuit, it draws an equivalent three-phase power which is $\sqrt{3}$ times greater than that of a single-phase load. Therefore with all other consumers being connected according to a three-phase circuit, the installed capacity of the power supply circuit must be increased by $\sqrt{3}$ and must exceed the aggregate capacity of all the consumers.

This is another serious disadvantage of single-phase apparatus.

As it has been shown above, an increase in the rating of single-phase apparatus (electric furnaces) makes the balancing of such apparatus absolutely inevitable. And if this problem was not faced before, this may be attributable not only to relatively small ratings of such single-phase apparatus (electric furnaces) in operation, but mainly to the fact that according to prior art standards a much greater (5%) unbalance was allowable at that time than nowadays.

In many countries the requirements imposed on the power unbalance (especially with low-power supply circuits) are even more stringent, with the balancing problem acquiring therefore a decisive importance for the apparatus (electric furnaces) delivered to these countries.

In the now-existing apparatus the rate (uniformity) of heat liberation varies over a wide range from the central zone of evaporating trays to their circumference, a a feature which does not contribute to more complete abstraction of power and to the better and more intense process of distillation of harmful impurities.

Moreover, the restricted rating of single-phase apparatus imposes limitations to the size of evaporation trays which in turn affects the absolute and relative sizes of condensing shield areas. The relatively small areas of condensing shields do not promote the efficient condensation and removal of harmful impurities.

The main object of the present invention is the provision of an apparatus for continuous refining of metals which makes it possible to improve the quality of metal refining and to enhance substantially the efficiency of processing the melt by intensifying the distillation of harmful impurities.

Another object of the invention is to provide an apparatus for continuous refining of metals which ensures the separation of condensing zones of continuously removed volatile impurities in accordance with their concentration in a fluid that is refined metal, decreasing gradually from one stage to another along the height of the distillation column, which intensifies the process of distillation of impurities and improve the quality of metal being refined.

Still another no less important object of the present invention is the provision of an apparatus for continuous refining of metals which makes it possible to increase substantially the input power and to ensure the uniform loading of the supply electric circuit which rules out the use of balancing devices even in low-power energy systems.

A further object of this invention is to provide an apparatus for continuous refining of metals which provides a uniform liberation of heat from the central portion to the circumference of each stage of the distillation column by so arranging heater rods relative to each other or by choosing the section of the heater rods that the uniform thermal effect of each heater rod ensures regular heating of the metal being refined, more complete abstraction of power and more complete and intense process of distillation of harmful impurities.

Yet another object of the invention is to provide an apparatus for continuous refining of metals which allows intensifying the process of condensation of harmful impurities and providing more complete removal of these impurities by increasing the relative and absolute areas of condensing shields and enhancing simultaneously their functional dependability.

To the accomplishment of the foregoing and related ends, the invention consists in an apparatus for continuous refining of metals, comprising an air-tight cooled casing, evacuated from the inside, wherein is mounted a distillation column with evaporation stages, of which the upper one is continuously fed with molten metal to be refined, flowing off sequentially through all the stages to the apparatus outlet, an electric heater extending through the evaporation stages to evaporate impurities from the metal, perforated condensing shields encompassing the stages, and a cooled condensate tank.

The apparatus is characterized in that a group of graphite rods of the electric heater, connected according to a three-phase circuit, runs through the evaporation stages along the height of the distillation column, with the stages being imparted such a shape that the molten refined metal flows off from the upper intake stage to the lower stage in the form of a thin film.

The above outlined engineering improvement enables a sequential process of refining of such metals as, e.g., lead, tin and others, flowing off in the form of a thin film. This increases the evaporation surface of impurity vapors, referred to hereinafter as volatilized impurities, and, hence, enhances both the quality and the efficiency of refining.

Moreover, the connecting of the novel electric heater according to a three-phase circuit enables a substantial increase in the rating and output of the proposed apparatus over conventional single-phase apparatus, providing in the mean time a uniform loading of the supply electric circuit.

According to one of possible embodiments of the present invention, an apparatus for continuous refining of metals is characterized in that the evaporation stages are shaped as elongated boxes mounted one upon another, the heater rods are disposed parallel to the longitudinal axis in the bottom parts of these boxes, and each box has one intake longitudinal side which is inclined to ensure the metal effluence onto the bottom portion, an opposite outlet side which is open and shaped as an overflow sill through which the metal flows over to the underlying stage, and face walls, one of which is provided with an outlet located in its upper portion and adapted for discharging the volatilized impurities to the condensing shields. The boxes are set up in succession and are turned through an angle of 180° relative to one another so that the volatilized impurities from adjacent stages escape through the outlets in opposite directions.

The above-described embodiment of the invention suggests one of the best structural shape of the distillation column stages.

It provides the separation of condensing zones of continuously removed highly volatile impurities in accordance with their concentration in the molten refined metal, decreasing gradually from one stage to another along the height of the distillation column, which intensifies distillation and improves the quality of the metal being refined.

According to another embodiment of the invention, the apparatus is characterized in that the overflow surfaces of the longitudinal box sides are stepped lengthwise, with the bottom surface of each box interconnecting the stepped overflow sides having a certain reverse gradient to ensure the accumulation of metal in its drain zone on the bottom surface of each box.

The above-outlined embodiment of the invention gives a most efficient design of the overflow sides and bottom surfaces of the boxes of the distillation column stages.

With the above arrangement the evaporation surface is increased and a more efficient removal of impurities is provided along with the stirring and through heating of the entire mass of the molten refined metal.

Moreover, according to the invention, the inventive apparatus is characterized in that the upper intake stage of the distillation column is a four-walled box with an overflow in the form of a plurality of holes located lengthwise in its bottom portion to ensure the discharge of metal onto the intake side of the underlying stage.

The above embodiment of the present invention envisages an optimum structural shape of the upper intake stage of the distillation column.

It ensures both the accumulation and the heating of the metal being refined and its uniform distribution along the entire surface of the intake longitudinal side of the box, the underlying stage and all the next stages of the distillation column, which in turn provides for high quality of refining and complete removal of impurities.

Another possible embodiment of the invention provides an efficient design and arrangement of the heater within the distillation column.

The herein-proposed heater is made up of three rods, connected according to a three-phase circuit and arranged so relative to the longitudinal axis of the box that the distances from each rod to peripheral points of a given box are almost equal to each other, with the interrod spaces being at least 1.2 times larger than the distances. This provides a uniform liberation of heat from the central part to the circumference of each stage of the distillation column and between the heater rods, regular heating of the metal being refined, more complete power abstraction and an intense process of distillation of harmful impurities.

The same object can be achieved in another embodiment of the invention that gives a most efficient design of the middle heater rod, which is given a cross-sectional area is at least 1.2 times larger than that of the outer rods.

Still another embodiment of the invention is based on the use of the best design of the lower distillation column stage which is shaped as a four-walled accumulating box with an overflow wall and outlets for the effluence of the volatilized impurities provided in the remaining side walls, and an conduit in the bottom part of the box for draining the refined metal. This ensures a more uniform chemical composition of the metal being refined and complete removal of impurities before the draining of the refined metal.

Finally, there may be one more embodiment of the invention which gives the best shape of the distillation shields, provided with vertical ridges that enhance their rigidity and increase the condensing surface and, hence, the intensity and completeness of the process of removing impurities.

The nature of the invention will be clear from the following detailed description of a particular embodiment and the accompanying drawings, in which.

Figure 1:
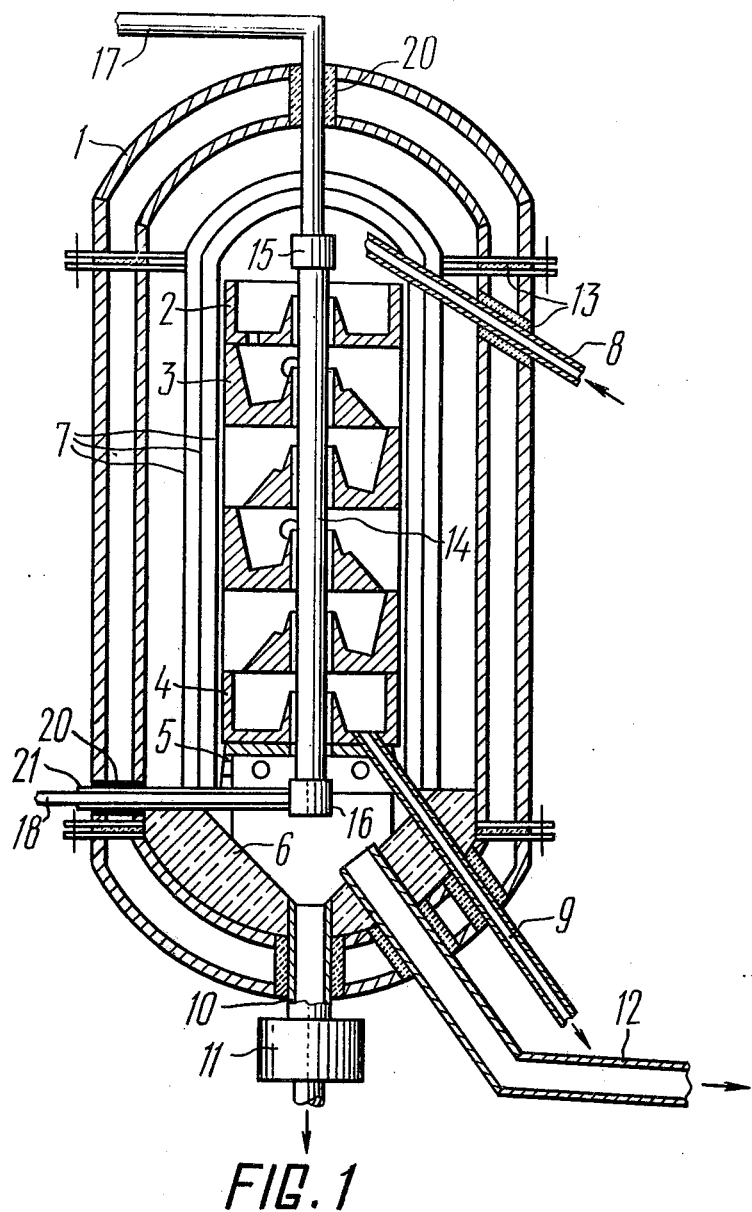
FIG. 1 is a cross-sectional view of the apparatus according to the invention.
Figure 2:
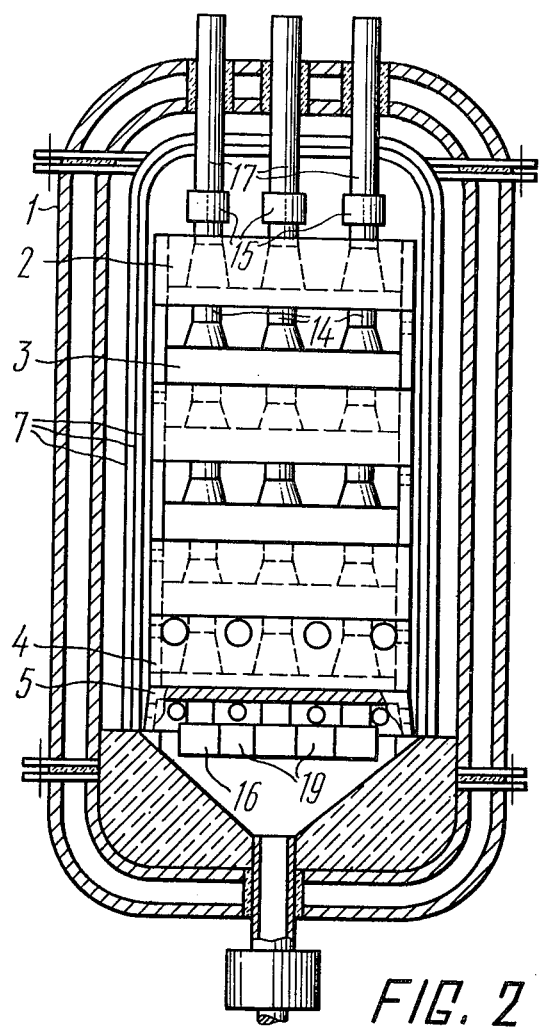
FIG. 2 is a longitudinal sectional view of the same apparatus.

A vacuum apparatus for continuous refining of metals comprises an air-tight water-cooled casing 1 (FIGS. 1 and 2) accommodating inside a distillation column built-up of an intake stage 2, several evaporation stages 3 and an accumulating lower stage 4.

The stages shaped as elongated boxes are produced from a carbonaceous graphitized material. The column rests through a graphitized support 5 on a lining 6 placed in the lower part of the casing 1.

Outside the distillation column are mounted condensing shields 7. To enhance the degree of condensation the shields 7 are perforated with the openings being staggered. To increase the mechanical rigidity of the shields and their condensing areas they are provided with vertical ridges, e.g. rectangular or semicircular in shape. These features, outlined in detail in the description, are not shown in the drawings which would otherwise become too overloaded. The internal surface of the casing 1 acts also as a condenser. A barometric pipe 8 is mounted above the intake stage 2.

Figure 3:
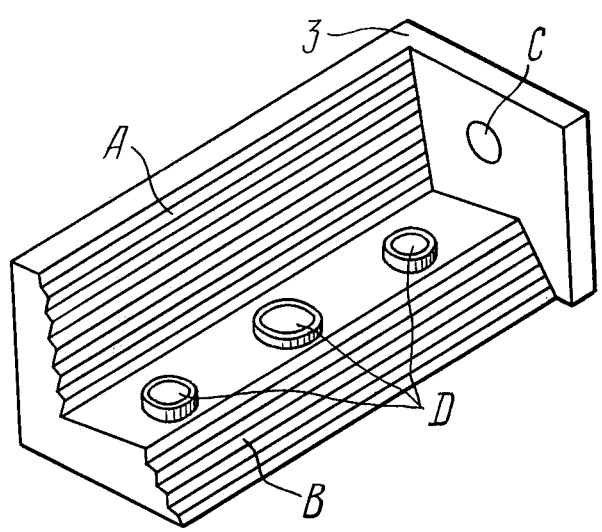
FIG. 3 shows the evaporation stage of the apparatus presented in FIGS. 1 and 2, with the face wall not shown conventionally.

The bottom of the intake stage 2 has a plurality of overflows disposed along one of its vertical longitudinal walls. The accumulating stage 4 is fitted with an overflow conduit arranged below and adapted for draining molten metal. One of its walls is inclined to receive the melt and the remaining vertical walls of this stage are fitted with holes located in their upper portions. Each lower evaporation stage 3 is turned or offset relative to the upper one through an angle of 180°. These evaporation stages 3 are illustrated in FIG. 3 (with one face wall being not shown conventionally). The longitudinal wall A is inclined; its surface may be either smooth or stepped lengthwise (as it is shown in the drawing) to increase the area and surface of film evaporation of the metal. A bottom of the evaporation stage 3 rises towards the overflow sill. The overflow sill B may also have either a smooth surface or it may be stepped lengthwise, as it is shown in the drawing, to increase the area and the surface of metal film evaporation. The upper portion of the evaporation stage face wall has one or several outlets C for the directed effluence of the volatilized impurities. Another face wall, not shown in the drawing, is solid.

Through holes D provided in the stage bottom and adapted for the passage of the heater rods may be either similar in cross-section but with the spacings therebetween exceeding by at least 1.2 times, e.g., by 2 times, the distance to any point of the stage, or, as it is shown in the drawing, the cross-sectional area of the central hole and of the rod passing therethrough may be more than 1.2 times, e.g. by 2 times, larger than that of the extreme holes. A combination of these two versions is also feasible.

Arranged adjacent to the lower stage is a pipe 9 for the removal of the refined metal. A pipe 10 is adapted for draining condensate into a water-cooled condensate tank 11.

The casing space is evacuated via a branch pipe 12 connected to a vacuum system (not shown in the drawing). To ensure the evacuation of the entire volume the support 5 is perforated.

The joints between the elements of the casing 1 as well as the places through which the pipes 8, 9, 10 and 12 extend are fitted with vacuum seals 13.

Graphite rods of a heater 14 run through all the evaporation trays, with the top and bottom ends of these rods being fitted with contact units 15 and 16.

The heater graphite rods are positioned in a row and to provide more uniform abstraction of heat power in the interrod spaces the middle rod is at least 1.2 times, e.g., 2 times, larger in cross-section than the extreme ones, and (or moreover) in the interrod spaces exceed by at least 1.2 times, e.g., by 2 times, the distance from any heater rod to any point of the surrounding trays. Connected to the contact units 15 and 16 are current leads 17 and 18 extending beyond the limits of the casing 1. The leads are coupled to the tappings of a single three-phase transformer or to those of three single-phase transformers.

The lower ends of the rods of the heaters 14 can be star-connected by means of a cross connection 19, with the current lead 18 being in this case neutral. This wiring diagram is simpler in terms of its design and is perferable from the point of view of cutting down the number of current lead holes in the bottom part of the casing 1, which require sealing. The star connection may be obtained without a neutral lead.

The places through which the current leads 18 and 17 extend through the casing 1 are fitted with electric insulation and vacuum seals 20. With a view to enhancing their serviceability, the contact units 15 and 16 and the current leads 17 and 18 are water cooled. Moreover, each current lead 18 is enclosed in a protective (graphite or quartz) tube 21 to rule out the effect of volatilized impurities and condensate.

The vacuum metal refining apparatus operates in the following manner. Impure melt is supplied via the barometric pipe 8 to the intake stage 2 wherefrom it flows in the form of a thin wide film through the lower outlet onto the inclined wall of the evaporation stage 3 and accumulates on its bottom; then it overflows (as it is accumulated) through the open inclined wall, shaped as an overflow sill, onto the inclined wall of the underlying stage.

The process continues until the metal reaches the accumulating stage 4 from which the refined metal is discharged along the pipe 9.

Volatilizing impurities escape over the low wall shaped as a sill and through the outlets in one of the face walls; upon being condensed on the shields 7 they run off therealong into the lower part of the apparatus and then to the pipe 10. The impurities issuing from the pipe 10 are admitted into the water-cooled condensation tank 11 and then into the receiving tank.

The working stages 2, 3, 4 and the support 5 can be produced by machining or they may be manufactured in the form of shaped blanks corresponding in size to those of standard graphite blocks, with the necessary machining allowances.

It is quite obvious that, in case of necessity, the working stages of the apparatus distillation column can be produced either from such graphite blocks or from shaped blanks of other sizes.

In any case the area of such graphite stages is substantially increased over that of the now-existing single-phase apparatus which contributes to a higher output. Thus, graphitized electrodes of the following dimensions: 75, 100, 125, 150, 175, 200, 225, 250, 300, etc. up to 710 mm, can be employed as the apparatus heater. In comparison with the present-art single-phase prototypes, 250 kVa in capacity, an industrail model of the proposed apparatus can have an output of 750 kVa, without involving any technical hazard.

The herein-proposed apparatus may find extensive practical application in producing pure metals by the refinery distillation technique. Thus, it can be employed for purifying tin from lead and bismuth by refining. Another possible efficient application of the apparatus is the continuous separation of zinc from lead.

As it is known, the use of zinc for extracting precious metals from lead results in the contamination of lead with this metal, and for producing high-quality metal, zinc should be separated from lead. The vacuum process of purifying lead from zinc, as well as tin from its impurities, is based on different metal boiling points and on a considerable difference between zinc and lead vapor pressures.

The proposed apparatus ensures the creation of all prerequisites for the rapid distillation of zinc: a large molten lead surface in evaporation stages with the lead flowing off from one stage to another in a wide film-like stream. This provides for the most efficient film evaporation of the volatilized impurities from the metal being refined.

What we claim is:

1. An apparatus for the continuous refining of metals, comprising: an air-tight cooled casing (1) in which vacuum is maintained; a distillation column set up under the vacuum inside said casing and made up of a number of evaporation stages (3) and of an upper intake stage (2) that is continuously fed with molten metal which, being refined, flows off in succession through all said evaporation stages into a lower accumulating stage (4) wherein the refined metal is collected; condensing shields (7) surrounding said stages; an electric heater (14) including a group of graphite rods running through said stages along the entire height of said column; means (17, 18) for supplying electric energy to said rods; said evaporation stages constituting containers with metal overflows, the shape and arrangement of said containers ensuring continuous discharge of the molten metal from said intake stage to said accumulating stage in the form of a thin film passing in a zone of thermal influence of said heater which provides a temperature sufficient for the distillation from metal of volatilized impurities.

2. The apparatus as defined in claim 1, wherein said shields (7), encompassing said stages (2,3,4) of the distillation column, are perforated and provided with vertical ridges that enhance the rigidity and increase their condensing surfaces.

3. The apparatus as defined in claim 1, wherein said evaporation stages (3) are shaped as elongated boxes set up one on another; said rods (14) being disposed parallel to the longitudinal axes of said boxes, running through their bottom parts; each box having one intake longitudinal side (A) inclined to provide metal effluence onto said bottom parts, an opposite outlet side (B) which is open and shaped as an overflow sill over which the metal flows to the next underlying stage, and face walls, one of which is fitted in its upper portion with an outlet (C) for the effluence of the volatilized impurities to said shields (7); said boxes being mounted in succession and offset relative to each other by an angle of 180° so that the impurities flow through said outlets in the adjacent stages in opposite directions.

4. The apparatus as defined in claim 3, wherein overflow surfaces (B) of said intake sides (A) are stepped lengthwise, with the bottom surface of each box, that interconnects said stepped overflow sides, having a reverse gradient for the accumulation of the metal draining on the bottom of each box.

5. The apparatus as defined in claim 4, wherein said intake stage (2) is a four-walled box with an overflow made in the form of a plurality of holes arranged lengthwise in its bottom portion to ensure the discharge of the metal onto said intake side (A) of the underlying stage.

6. The apparatus as defined in claim 5, comprising three of said heater rods (14), connected according to a three-phase circuit provided for said heater, disposed parallel to the longitudinal axes of said boxes (2) so that the distances from said rods to peripheral points of the respective boxes are almost identical, and the inter-rod spaces are at least 1.2 times larger than the identical distances.

7. The apparatus as defined in claim 5, wherein the cross-section of a middle one of said heater rods (14) is at least 1.2 times larger than that of at least one outer rod.

8. The apparatus as defined in claim 7, wherein said accumulating stage (4) constitutes a box with four walls, of which one is an overflow wall and the remaining three walls are fitted with outlets for the effluence of the volatilized impurities, and the bottom part of this box is provided with an overflow conduit for the discharge of the refined metal.

* * * * *